United States Patent Office 2,893,758
Patented July 7, 1959

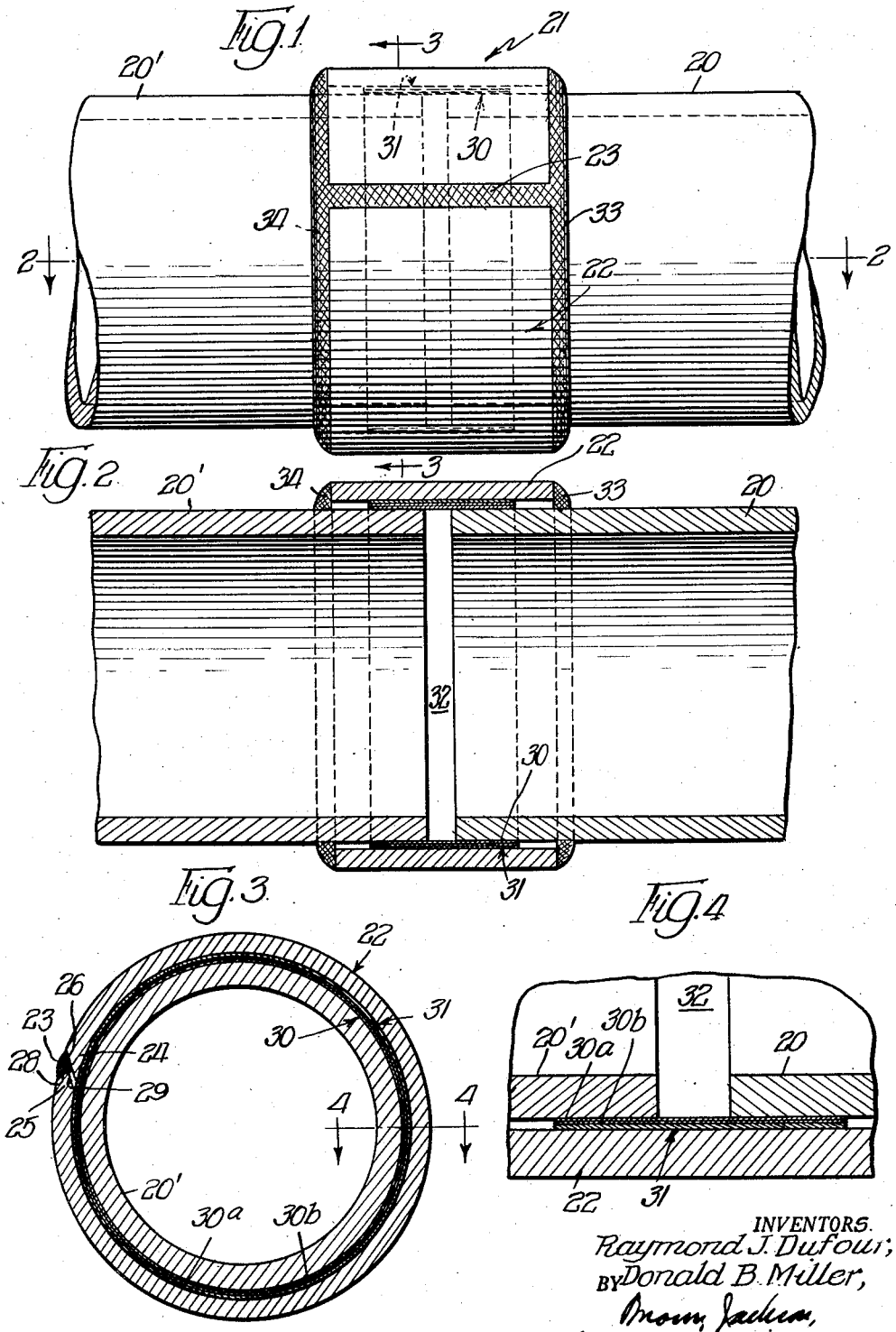

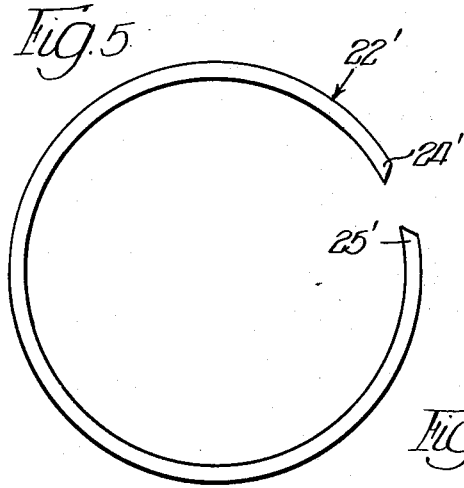
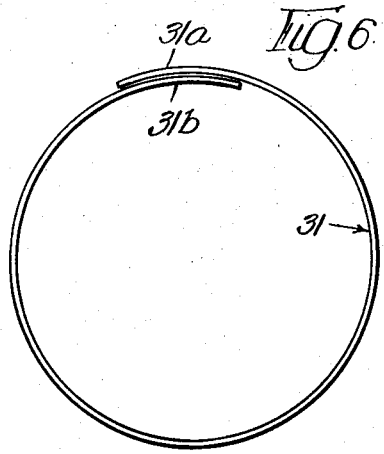
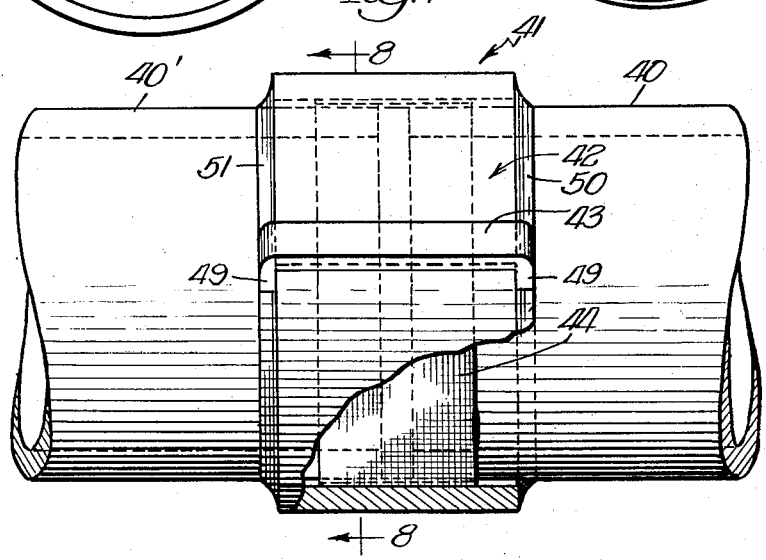
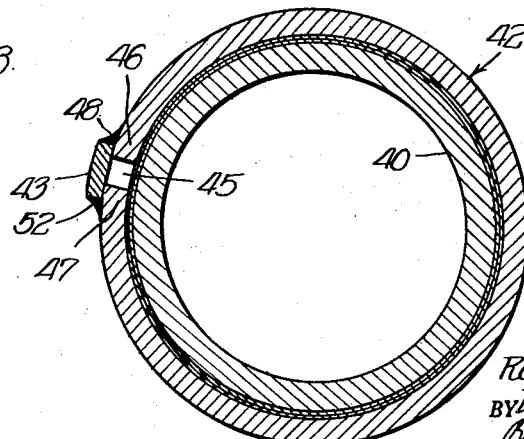

2,893,758
FIRELESS WELDED TIE-IN COUPLING FOR GAS MAINS

Raymond J. Dufour and Donald B. Miller, Wheaton, Ill.

Application October 13, 1954, Serial No. 462,029

2 Claims. (Cl. 285—286)

This invention is directed primarily to a method and means for joining together two lengths of adjoining pipe carrying combustible fluids or gases under pressure. More particularly our invention concerns an improved coupling means for connection between two lengths of pipe whereby the same may be coupled by a so-called "hot tie-in" welding operation.

A commonly employed method of joining a new section of pipe with an old section of existing pipe to extend the service of a gas line or to replace a worn-out section thereof, for example, is the so-called "hot tie-in" method whereby the welded junction of the two pipes is effected while gas is allowed to flow through the pipes. Under this method, the gas is permitted to escape between the abutting ends of the old and new pipe when making the welded connection. As a consequence, the gas is ignited by the welding torch and large quantities of flame issue from the joint during the welding process making it extremely difficult for the welder to work in safety and comfort. Since the amount of flame that can be tolerated by the welder is quite critical, elaborate measures have been and must be taken to control the amount of fire caused by igniting the gas. The usual procedure for controlling the amount of fire is through the regulation of the gas pressures. However, the controlling of the gas pressure is not always a simple task and, as a consequence, it is not always possible to effect a "hot tie-in" by presently known means and methods with complete safety to the operating personnel. To those familiar with the gas industry, the necessity of making "hot tie-ins" is understandable; the same being resorted to in order to avoid explosive mixtures of gas and air in the gas line which occur if the line is not entirely exhausted of gas.

Briefly, the junction means and method we propose eliminate the necessity for close pressure control in the gas line and eliminates the ignition of the gas at the junction during the welding operation. The method and means of this invention also eliminate the necessity of accurately fitting the abutting ends of the pipe in order to accomplish their welded connection. This latter advantage is largely responsible for a marked increase in economy of operating time under our method. The added safety factor of eliminating ignition of the gas at the point of the welded junction is also a marked advantage of this invention. In brief then, it may be stated that while our means and method permit the successful junction of pipes carrying illuminating gas or other combustible fluids or gases so as to effect a "hot tie-in," the same nevertheless leads to an advantageous departure from the normal procedure of joining pipe sections by the "hot tie-in" method in that the ignition of the gas at the point of joining the pipes is eliminated. In that respect our coupling means and method may be termed a "fireless, hot tie-in" process and means.

The main object of our invention is to provide a new and improved coupling means for joining lengths of pipe carrying illuminating gas and like combustible gases and fluids.

Another object of our invention is to provide a new and improved connector means and method of employing the same whereby a "hot tie-in" of sections of gas carrying pipeline may be effected while gas is flowing under pressure in such pipeline without the presence of flaming gas at the point of welding such pipe sections.

A further object of this invention is to provide a new and improved method of joining sections of gas carrying pipeline to the end that the pipe sections may be welded together to effect a gas-tight seal while gas is flowing in the pipeline.

A still further object of this invention is to provide a new and improved fluid-tight sealing means for effecting a junction between near abutting ends of pipe sections so that such may be welded together while carrying illuminating gas and like combustible fuels under pressure.

The above and further objects, features and advantages of our invention will be recognized by those familiar with the art from the following detailed description and specifications of a preferred and modified form of coupling device embodying the principles and concepts of our invention as illustrated in the accompanying drawings.

In the drawings:

Figure 1 is a side elevational view of two pipe sections joined together with a preferred form of coupling means of our invention;

Figure 2 is a cross sectional showing of the junction illustrated in Figure 1 as taken substantially along line 2—2 of that figure;

Figure 3 is a cross sectional showing taken transversely of the coupling means illustrated in Figure 1 substantially along line 3—3 of Figure 1;

Figure 4 is an enlarged partial cross sectional showing taken through the coupling means and pipe joined thereby as seen substantially from vantage line 4—4 of Figure 3;

Figure 5 is a side elevational showing of a modified split collar member for use in the coupling assembly of Figure 1;

Figure 6 is a side elevational showing of a flexible metal band used in the coupling assembly of Figure 1;

Figure 7 is a side elevational view similar to Figure 1, with parts broken away in cross section, illustrating a modified form of coupling device embodying the principles of this invention and shown in its operating position for coaxially joining two sections of pipe; and Figure 8 is a cross sectional view taken transversely of the longitudinal axis of the pipe junction illustrated in Figure 7 and substantially along line 8—8 of that figure.

Considering initially Figures 1–6 of the drawings, a preferred form of junction means or coupling connector made in accordance with the principles and concepts of our invention and arranged to be employed according to the improved method of effecting a fireless "hot tie-in" between sections of gas carrying pipe is illustrated. According to these figures, two lengths of pipe 20 and 20' are welded together by virtue of the interconnecting function of our improved coupling device indicated generally by numeral 21.

The preferred form of coupling device 21 comprises a split collar member 22 which is normally formulated from a section of metal piping having substantially the same wall thickness as pipes 20 and 20' and an internal diameter sufficient to accommodate the external diameter of such pipe sections. The collar 22 is split transversely by a substantially V-shaped groove for accommodating a welding bead 23 which effects the connection of the collar as will be described presently hereinafter. More specifically with reference to Figure 3 of the drawings, it will be appreciated that the collar 22 has its abutting ends so formed that one end portion 24 thereof will underlap the adjacent end portion 25 when the same are brought into near abutting engagement by a suitable tensioning tool means. Notice particularly that the end 24 of the collar member is beveled angularly by wall portion 26. An inner portion of wall 26 is designed to underlie the apex of a pair of intersecting wall portions 28 and 29 of the collar's end portion 25 when the collar is positioned about the pipe sections 20 and 20'.

As to an alternate means for formulating the abutting ends of the collar member 22, reference should now be had to Figure 5 from which it will be understood that end portions 24' and 25' of collar 22' shown are beveled similarly at a suitable angle so that when the same are brought into near abutting engagement they formulate a V-shaped groove for accommodating the weld 23.

The width of the collar member 22 is sufficient to substantially overlap the ends of the pipe sections 20 and 20' say, for example, a width of four to six inches for the collar member which would then permit substantially two to three inches of each pipe section to be overlapped by the collar member when the latter is assembled in position.

In addition to the collar member 22, we also provide a length of sealing tape 30 which is designed to be wrapped around the two pipes substantially across their line or plane of junction thereby to effect a gas-tight seal of a somewhat temporary nature, but of sufficient soundness to prevent the escape of gas from the interior of the pipe. The tape 30 is preferably of adhesive type and of such a length that several layers or wrappings thereof (see layers 30a—30b of Figure 4) may be secured about the pipes 20 and 20'; the tape sticking securely to the outer surface of the pipes and serving to bridge the gap between the adjacent or abutting ends thereof. One such tape which we have found to be completely satisfactory and which demonstrates outstanding characteristics in the circumstances of this particular usage, is commercially available from Mystik Adhesive Products Company of Chicago, Illinois and sold under the brand name of Mystik Brand No. 7,000 G and 7,100 G tape. Such tapes are formed from Fiberglas material which is characteristically fireproof. The tape may have adhesive on one or both sides as desired. The tape is designed to withstand temperatures upwards of 300 to 450° F. and so is ideal for our present purposes. We have found that wrapping several layers of the tape tightly about the junction of the two pipes 20 and 20' effects a satisfactory gas-tight seal which prevents the escape of gas from the interior of the pipeline.

Designed to be mounted about the tape 30 is a flexible inner band 31 of stainless steel (see Figure 6). Band 31 is approximately two to two and one-half inches in width so as to effectively bridge the gap between the pipe sections 20 and 20'. The band serves as a friction resisting medium between the interior of the split coupling collar 22 and the Fiberglas sealing tape 30. In certain circumstances to avoid undue friction between the band 31 and the tape 30, it is desirable to coat the exterior of the tape layer with a sealing compound of a noncombustible nature having a high temperature viscosity ability, such as is found in silicon type greases. The flexible innerband 31 is designed as an open end band having its end portions 31a and 31b (see Figure 6) overlapping so that the same may be securely tightened about and encircle the layers of sealing tape 30. The band's main purposes is to prevent the destruction of the tape 30 from the welding torch and in that sense serves as a thermo-resistant medium or insulator to prevent the open flame of the welding torch from reaching the Fiberglas tape.

The abovedescribed elements constitute the working portions of our improved combination or coupling device 21 which is mounted and placed into operation briefly as follows: Initially the pipe sections to be joined, such as the pipe 20 and 20', are brought substantially into longitudinal alignment with their adjoining ends close together. Several layers of the Fiberglas tape 30 are then wrapped tightly around the pipes so as to bridge or cover the gap 32 between their ends. A small amount of sealing compound of the silicon grease type, for example, may then be spread over the surface of the tape after which the flexible metal band 31 is placed over the tape. The metal band 31, as mentioned, has its end portions overlapping, so that the same completely encircles the two pipes. A suitable clamp means is applied to tension the band and draw it snuggly and uniformly around the joint, compressing the tape and the sealing compound. The outer end of the band 30 is then securely tacked in place by using silver solder or brazing rod and a welding torch. The clamp means can then be removed and the temporary seal so formed tested for gas leaks.

The split coupling collar member 22, which has been previously placed about one of the pipe sections 20 or 20', is then centered over the sealed joint and the clamp or other suitable tensioning device which was used previously to draw the flexible metal band 30 into position is applied to the metal collar. The clamp is tightened to draw the split band tightly about the two pipes bringing the beveled ends or edges thereof closely together. The weld then proceeds to weld two circumferential seams 33 and 34 about the lateral edges of the split collar so as to join the same rigidly to the pipe sections 20 and 20' followed by the placing of the welded seam 23 in the split of the collar. It should be noted that each weld is completed all the way around the pipe before proceeding to another and that since the joint has been previously sealed by the presence of the fireproof tape layer 30, there is no fire at the point of welding so that the connection may proceed quickly and properly with assurance of complete safety to the operator.

In practicing the form of invention hereinabove described, it should be pointed out that the sealing compound selected for use between the flexible metal band 31 and the tape layer 30 should be of a character that when subjected to heat will not give off obnoxious vapors and gases which might interfere with the welding. Also the compound should be substantially fireproof so that the same will not disintegrate under the heat of the welding torch. The tape selected should likewise be of a noninflammable nature which will not disintegrate under heat and may or may not have an adhesive backing as described. We have found that the use of the adhesive backing on the tape is advantageous from the standpoint of the operating personnel since it assists them to apply the tape in effecting a gas-tight seal. It should further be remembered that the tape must have sufficient flexibility so as to conform to the exterior contour of the pipe sections which it is interjoining. Also, the tape layer should have some yield strength so as to give a little after its application due to the fact that the heavy metal split collar 22 may or may not move the pipes when tensioned, depending on their alignment. Also, the tape 30 must be quite thin so as to avoid forming a large lump or hump under the collar 22 thereby to avoid undue spacing of the split collar from the surfaces of the pipes which would be damaging to a successful welded junction between the collar and the pipes. As regards the metal band 31, the same should be relatively thin so that it too will substantially conform to the contour of the pipes and will be capable of some stretch under tension to make a tight sealing connection with the tape. The width of the band should be maintained at a relatively smaller dimension than the width of the outer split collar so that in any sealing compound which is squeezed to the lateral margins of the band will not flow outwardly beyond the lateral edges of the split metal collar when effecting the welded junction or beads 33 and 34. The split metal collar 22 should have equivalent strength to the pipe sections which it is to join and be of approximately the same wall thickness therewith. However, the collar does not have to be identical metal with the pipe, but its diameter should be maintained at a dimension sufficient to permit it to be tightly drawn about the pipes without undue gap between its opposed ends. It should be regarded also that the provision of the underhanging surface 26 of the collar's end portion 24 provides a means for conveniently preventing the flame of the welding torch from burning through the tape and reaching the interior of the pipes (see Figure 3).

Having thus described the features and functions of our preferred form of coupling device 21 and its mode and method of use, attention now is drawn to the modified coupling structure illustrated in Figures 7 and 8 of the drawings. From these figures it will be understood that a pair of pipe lengths 40 and 40' are arranged to be joined by our modified form of coupling device 41 illustrated. The device 41 comprises a split ring coupling collar 42 formed substantially as ring 22 heretofore described with the exception that this collar is split with a straight transverse cut. A bridging strap 43 is connected to the outer surface of the collar to bridge the gap between the ends thereof. A band of fire resistant tape 44 is placed about the pipes over the gap between their adjacent ends; there being several layers of such tape.

The collar member 42 is formed with an internal diameter sufficient to accommodate the external diameter of the pipe sections 40—40' and quite a sizable gap 45 is provided intermediate the adjacent, but separated end portions 46 and 47 of the collar. The gap 45 and the consistent formation of the collar permits a generous variation in the closed diameter of the collar so as to accommodate a sizable range in pipe diameter variation. The bridging strap 43 constitutes a length of metal strap iron which is normally affixed adjacent one edge to the collar 42 as by welded bead 48. The other side of the straps is left free until after the collar is assembled in its final position about the pipes 40 and 40' thereby permitting movement of the end portions 46 and 47 relative to one another when compressing the collar into position. It should also be noted that the bridging strap 43 is provided with turned down end portions 49—49 which extend across the thickness of the collar and serve to enclose the ends of the gap 45 remaining between the collar's end portions 46 and 47. Because of the presence of the bridging strap 43, it is obvious that no means corresponding to the beveled end portions or surfaces 27, 28 and 29 of the collar 22 heretofore described is required to prevent burning through of the torch since the welder does not work in the gap 45 when mounting the collar means 42 but along one side of the bridging strap 43.

As a consequence of the above described construction for the collar 42, the interconnection of the pipe sections 40 and 40' is effected simply by placing the pipe sections in substantial axial alignment with their ends in near engagement. A length of the Fiberglas wrapping material 44 is then wrapped about and across the pipe ends to effect a temporary gas-tight seal in the manner described heretofore. Since the open flame of the torch will not extend through the gap 45 between the ends of the collar member 42 in this modified assembly, it is not necessary to provide the flexible metal band 31 as in the first form of assembly described. As a result, after sealing the gap 45 with the tape 44, the collar member 42 may be slipped directly over the Fiberglas 44 by sliding the same axially along one of the pipe sections 40 or 40' on which it has been mounted prior to the application of the sealing tape. When the collar 42 is placed in its desired position over the junction between the pipes, a suitable clamping means (not shown) is utilized to press the collar 42 tightly about the junction between the pipes, similar to the mounting of collar 22 heretofore described. The lateral edges of the collar 42 are then securely joined to the pipe sections by the beaded welds 50 and 51 followed by the welding of the bridging strap 42 to the other end portion of the collar as by weld 52. This completes the mounting of our improved and modified collar assembly 42 and from the foregoing, it will be recognized that in certain respects the construction and application of this modified form of device is simplified over the form 21 first described.

Again, it should be noted that the application of the collar 42 will serve to axially align the pipe sections 40—40' when drawn tightly into position by means of a mounting tool which will effect a circumferential tensioning of the collar when drawing the end portions 46 and 47 thereof toward one another. We have found in practice that a coupling assembly of the order illustrated in Figures 7 and 8 is completely satisfactory for effecting a "hot tie-in" with the application of approximately two or more layers of the Fiberglas sealing material 44 providing a completely gas-tight temporary junction between the ends of the pipes so that there is an entire elimination of flame at the junction when the welder is attaching the collar 42.

From the above description of the two forms of coupling device, it will be appreciated that we have hereinabove set forth the features, concepts and principles of operation for a new and improved coupling assembly and method of effecting a fireless "hot tie-in" between pipe sections carrying combustible fuels under pressure. While we have particularized our invention in association with illuminating gas, we contemplate as well its satisfactory application to situations involving fuels or materials other than gases, for example combustible fluids. From the success which this invention has experienced so far in the field, it is our concerted belief that we have presented a marked improvement in this form of coupling apparatus and in the method of its application. As a result, while we appreciate that numerous changes, modifications and substitutions of equivalent materials and devices may be resorted to in practicing our invention, nevertheless, it is felt that such will not depart from the spirit and scope of the inventive concepts involved. Therefore, it is not our intention that we be limited to the particular forms and features of the two coupling devices illustrated and the method described except as may appear in the following appended claims.

We claim:

1. An improved method for effecting a fireless "hot tie-in" coupling between sections of pipe carrying gas under pressure, comprising the steps of, placing the pipe sections in near end-to-end coaxial relationship, covering the gap between said pipe ends with a length of fire-proof flexible glass tape, placing a flexible metal band circumferentially over the gap between said pipe sections and radially outward of said tape, tensioning said band to tightly compress said tape, securing said band in position over said tape in a manner to retain its said tensioned condition, coating said band with a heat resistant lubricant, mounting a split metal collar member over said band, compressing said collar member radially to place the same under tension, welding the circumferential edges of said collar, each to one of said pipe sections, and welding the free ends of said collar together to thereby effect a gas-tight seal.

2. A coupling means for making a fireless "hot tie-in" coupling between pipe sections carrying combustible fluids under pressure, comprising, plural layers of fire-proof sealing tape wrapped about and between the adjacent ends of the pipe sections to be joined so as to temporarily seal the gap between such ends, a split metal collar mounted about said tape and overlaying end portions of said pipe sections, weld means joining the lateral edges of said collar, one to each of said pipe sections, overlapping end portions formed on said collar for defining the split therein and arranged when brought into abutting engagement to provide a metal to metal seal and to form a groove for receiving a weld connecting means, and a weld connection means interjoining said end portions of said collar.

(References on following page)

References Cited in the file of this patent

UNITED STATES PATENTS

| | | | |
|---|---|---|---|
| 369,574 | Wilbur | Sept. 6, | 1887 |
| 830,549 | Wilcox | Sept. 11, | 1906 |
| 843,892 | Haller | Feb. 12, | 1907 |
| 902,804 | Coghlan | Nov. 3, | 1908 |
| 1,240,957 | Doble | Sept. 25, | 1917 |
| 1,302,412 | Murray | Apr. 29, | 1919 |
| 1,347,579 | Henrikson | July 27, | 1920 |
| 1,508,373 | Lightfoot | Sept. 9, | 1924 |
| 1,700,319 | Kjekstad | Jan. 29, | 1929 |
| 1,982,630 | Bent | Dec. 4, | 1934 |
| 2,050,023 | Slayter | Aug. 4, | 1936 |
| 2,084,224 | Shaw | June 15, | 1937 |
| 2,180,695 | Rembert | Nov. 21, | 1939 |
| 2,188,925 | Ronay | Feb. 6, | 1940 |
| 2,320,700 | Kent | June 1, | 1943 |
| 2,330,039 | Feenstra | Sept. 21, | 1943 |
| 2,362,505 | Smith | Nov. 14, | 1944 |
| 2,502,877 | Needham | Apr. 4, | 1950 |
| 2,747,900 | Smith | May 29, | 1956 |

FOREIGN PATENTS

| | | | |
|---|---|---|---|
| 124,588 | Switzerland | Mar. 16, | 1928 |